United States Patent

[11] 3,617,642

[72] Inventor Enn Aro
Galion, Ohio
[21] Appl. No. 48,824
[22] Filed June 10, 1970
[45] Patented Nov. 2, 1971
[73] Assignee North Electric Company
Galion, Ohio
Continuation of application Ser. No. 692,430, Dec. 21, 1967, now abandoned.

[54] TIME DIVISION MULTIPLEX SYSTEM
11 Claims, 12 Drawing Figs.

[52] U.S. Cl. ........................................ 179/15 AA
[51] Int. Cl. ........................................ H04j 3/00
[50] Field of Search ........................................ 179/15 A, 15 AA, 15 AQ, 15 AT, 15 BY

[56] References Cited
UNITED STATES PATENTS 2,962,552 11/1960 Crowley ........................ 179/15 AA
3,420,959 1/1969 Hall ........................ 179/15 AA
2,962,552 11/1960 Crowley ........................ 179/15 Art
3,420,959 1/1969 Hall ........................ 179/15 Art

*Primary Examiner*—Ralph D. Blakeslee
*Attorney*—Johnson, Dienner, Emrich, Verbeck and Wagner

ABSTRACT: Arrangements for improving resonant transfer operation in time division multiplex communication systems by providing proper terminating impedance for lines connected to the highways during signal splitting by actuating the highway discharge gate during the signal transfer interval of the assigned time slot. In one embodiment involving interhighway gate means connected between transmit and receive highways, the inhibit signal to the interhighway gate means which accomplishes splitting is also directed as an enable signal to the highway discharge gate. At times, such as during the ringing operation, only the transmit highway discharge gate is so controlled, and at other times, such as during trunk signaling, both transmit and receive highway discharge gates may be so controlled.

INVENTOR
ENN ARO

BY Brown Jackson Boettcher & Dienner
ATTORNEY

INVENTOR

ENN ARO

BY Brown Jackson Boettcher & Dienner

ATTORNEY

INVENTOR
ENN ARO

BY [signature]
ATTORNEY

TIME DIVISION MULTIPLEX SYSTEM

This application is a continuation of application Ser. No. 692,430filed Dec. 21, 1967and now abandoned.

BACKGROUND OF THE INVENTION

1. Field of the Invention

The present invention relates to time division multiplex communication systems such as are found in Class 179 Subclass 15.

Description of the Prior Art

In known prior art units having resonant transfer circuits no provision apparently was made for proper terminating impedance during signal splitting. Highway discharge gate means of the prior art were operated only in time interval outside the signal transfer interval of communication time slots and never during the signal transfer intervals. In other words highway discharge was only effected between the signal transfer intervals.

SUMMARY OF THE INVENTION

One embodiment of the present invention is illustrated in a time division multiplex system having a transmit highway and a receive highway, each station (which may be a telephone instrument) being connected to the transmit highway over a transmit path comprising a TDM gate, and to the receive highway over a receive path comprising another TDM gate. Connections of the various lines to the transmit and receive highways are on a time division basis during discrete time slots. A communication path connecting the transmit and receive highways comprises an interhighway TDM gate which is pulsed on a time division basis during each time slot being used for communication. Each highway also has a connection to ground through an electronic gate to permit highway discharge between signal transfer intervals of communication time slots.

Registers and trunks are also connected to the transmit and receive highways over transmit and receive paths comprising TDM gates. Dial tone is received from the registers. Busy tone, ring, and ring-back tone sources are selectively connected to the receive highway by associated TDM gates for signal injection. Trunk supervision signaling tone is also selectively connected to the receive highway by an associated TDM gate.

The system is controlled by a line interrogate circuit, a transmit highway memory circuit, and a receive highway memory circuit which in turn are connected to a central control, the interhighway gate being controlled by the transmit highway memory via an inhibit gate. The transmit and receive highway memory circuits at all times contain a complete marking of the switching matrix status.

A pulse generator and distributor provide timing pulses to the central control, the transmit highway memory, the receive highway memory, and to the highway discharge gates.

As noted above, an inhibit gate is provided (which is in the drive path of the interhighway gate), the enable input of which is controlled by the transmit highway memory during each time slot in use for communication purposes. The inhibit input of the inhibit gate is controlled by the receive highway memory. The output of the inhibit gate is connected to the interhighway gate. With this arrangement the interhighway gate will be inhibited by the receive highway memory during each time slot in which signal injection to the receive highway occurs, thus accomplishing path splitting and preventing signals directed to the receive portion of station instruments from entering the transmitting portion.

Also, and OR gate is provided, one input of which is the highway discharge signal and the other input of which is the interhighway gate inhibit signal, which in this instance becomes an enable signal to the OR gate. The output of this OR gate is connected to the transmit highway discharge gate. With this arrangement, the transmit highway discharge gate connects the transmit highway to ground as enabled (*a*) by the highway discharge signal, and also (*b*) as enabled by the interhighway gate inhibit signal, whereby when an injected signal, such as a ringing signal or a ring-back tone signal, is being sent over the receive path to a telephone instrument with the interhighway gate inhibited and the transmit and receive highways disconnected from each other, the transmit highway will be grounded. With such operational mode the resonant frequency of the transmitting resonant transfer circuit is maintained, thus providing the proper terminating impedance for the transmit path from the telephone instrument to prevent reflections.

In a further embodiment, another OR gate is provided with like connections for operating the highway discharge gate for the receive highway. With this arrangement, the transmit and receive highways, in addition to being grounded during the regular discharge intervals between signal transfer intervals of time slots, will also be grounded whenever the interhighway gate is inhibited, providing the proper terminating impedance for both highways. THe arrangement has application, for example, in a trunk-to-trunk call involving two-way trunks having voice frequency transmitters and receivers in which the supervision tone is received over the trunk handling the incoming end of the calls. The signal splitting, by inhibiting the interhighway gate, prevents the received tone from going out over the trunk which is handling the outgoing end of the call (at least until the nature of the tone message is determined), and the grounding of both highways provides proper terminating impedance for both trunks at such time by preserving the resonant frequency of the resonant transfer RC circuits.

BRIEF DESCRIPTION OF THE DRAWINGS

Referring to the drawings.

DESCRIPTION OF THE PREFERRED EMBODIMENTS

Local Call

Figure 1A:
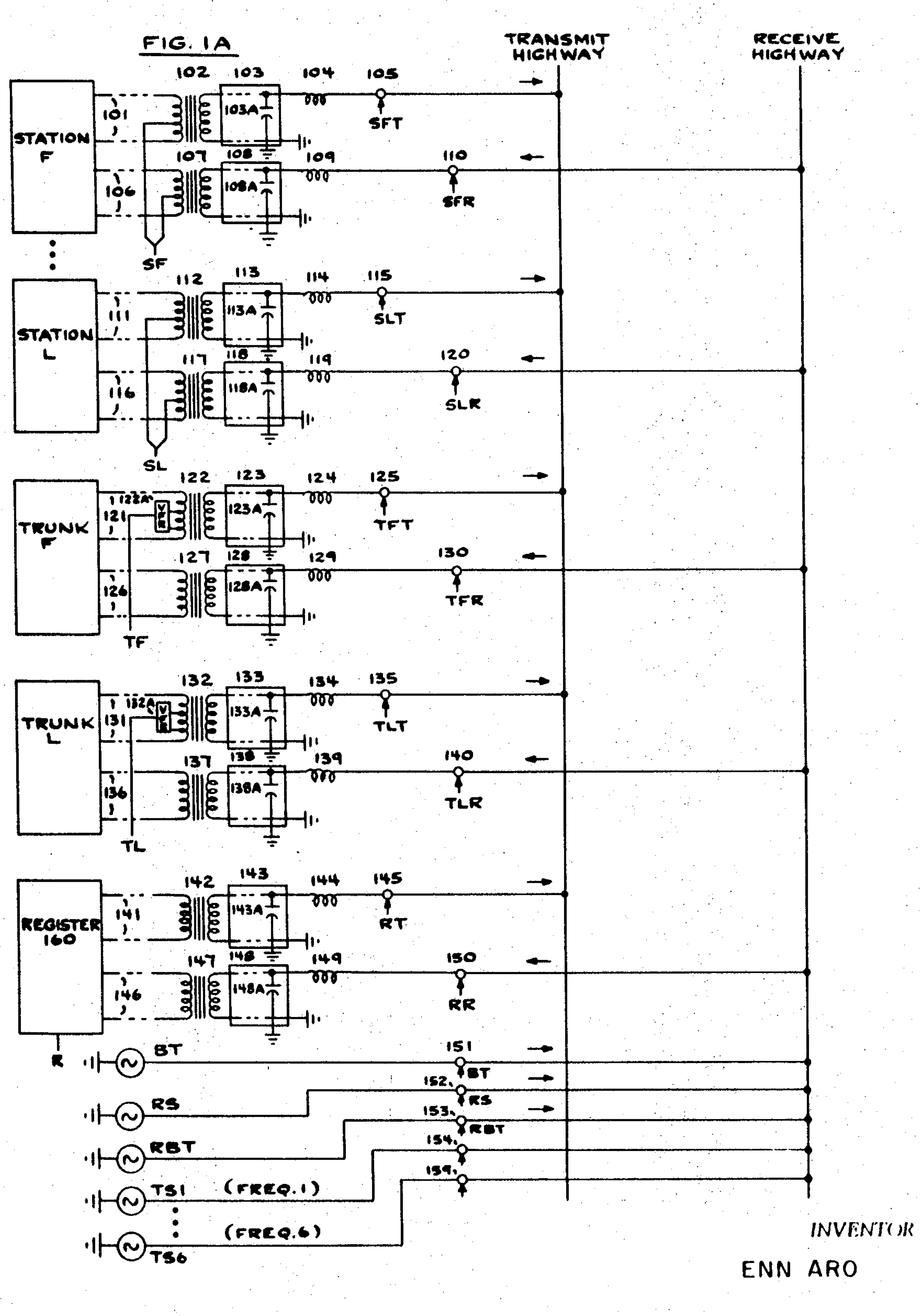
FIGS. 1A and 1B constitute a schematic representation of a system embodying the invention.

Referring to FIG. 1A, a number of stations F...L are shown as comprised of four-wire telephone instruments interconnected by a transmit and receive highway. In a call from station F to Station L, the party at Station F lifts his handset, and a direct current path is established over a transmit conductor pair 101, a receive conductor pair 106, and the midtaps of transformers 102 and 107 at the central office to interrogation point SF (station first). A line interrogate circuit L1 (FIG. 1B) is directed by a central control CC in an interrogate routine to detect the marking of SF. As the mark is detected, line interrogate circuit LI reports the condition to the central control CC which updates the status of Station F in the central control memory CCM and takes proper action for connecting Station F to an idle register.

The central control CC which keeps track of idle and busy registers in its memory, assigns an idle register of a group of registers, such as the illustrated register 160 (FIG. 1A), to the call; selects two idle time slots, such as time slots 1 and 2, as advised by means of its memory; places the addresses of transmit gate 105, associated with station F and interhighway gate IHG, in the time slot 1 word of the transmit highway memory circuit; places the address of receive gate 150 associated with the register 160 in the time slot 1 word of the receive highway memory circuit; places the adresses of transmit gate 145 associated with the register 160, and interhighway gate IHG in the time slot 2 word of the transmit highway memory circuit; and places the address of the receive gate 110 associated with station F in the time slot 2 word of the receive highway memory circuit.

Thereupon, the highway memories (FIG. 1B) pulses the selected gates in the signal transfer interval of selected time slots by pulsing gates 105, IHG (via inhibit gate IG), and 150 in time slot 1 over leads SFT (station first transmit), IH (interhighway) and RR (register receive) respectively; and gates 145, IHG, and 110 in time slot 2 over leads RT (register transmit), IH, and SFR (station first receive) respectively.

Station F receives dial tone from the register over gate 145, transmit highway, gate IHG, receive highway, gate 110 and the receive path at station F.

Thereupon, the party at station F pulses the called number into the register (by burst of frequencies over the transmission path as a result of pushbutton dialing, for example), these signals passing over gates 105, IHG, 150 and the receive path for register 160.

Upon receipt of the first digit; register 160 terminates transmission of dial tone. When the last digit has been received, register 160 forwards the called number to the central control CC over path R.

Thereupon, central control CC canvasses the time slot words in the transmit highway memory circuit THM and in the receive highway memory circuit RHM to find the time slots in use by the register 160. These time slot words also contain the identity of the calling station F which the central control CC stores in its memory for further processing of the call. Accordingly, the central control CC erases the address of gate 150 from the time slot 1 word in the receive highway memory circuit RHM and the address of gate 145 from the time slot 2 word in the transmit highway memory circuit THM, and marks the register 160 as idle in the central control memory CCM.

Also, the central control CC places the address of gate 115 associated with the called station L in the time slot 2 word in the transmit highway memory circuit THM; and the address of gate 120 for the called station L in the time slot 1 word in the receive highway memory circuit RHM, whereby gates 115 and 120 are pulsed via associated leads SLT and SLR. Additionally, the central control CC places the address of gate 152 in the time slot 1 word of the receive highway memory circuit RHM, and the address of gate 153 in the time slot 2 word of the receive highway memory circuit RHM whereby gates 152, 153 are pulsed in the signal transfer intervals of respective time slots via associated leads RS (ring signal) and RBT (ring back tone).

Station L now receives a ring signal over gates 152 and 120 in time slot 1; and station F receives the ring back tone signal over gates 153 and 110 in time slot 2.

The receive highway memory circuit RHM has logic circuitry therein whereby, for each time slot whose corresponding word in the receive highway memory RHM contains the address of a signal injection gate, it puts out the IHI (interhighway inhibit) signal to inhibit gate TG thus preventing the IH pulses in those time slots from reaching interhighway gate IHG, and as a result disconnecting the transmit highway from the receive highway. Accordingly, the address of signal injection gates 152 and 153 in time slot 1 words 1 and 2 respectively of the receive highway memory, the transmit highway will be disconnected from the receive highway during the time slots used for ring and ring back during the ringing period.

Furthermore, the IHI signal to OR gate OR1 during time slots 1 and 2 causes this gate to actuate the highway discharge gate HD1 to ground the transmit highway, thus providing the proper terminating impedance for the transmit highway be preserving the resonant frequency of the RT circuit, which will be described more fully hereinafter.

When the party at station L answers by lifting the handset, the central control CC detects the answer by the called party via the line interrogation circuit L1, determines the status of station L, canvasses the time slot words in the transmit highway memory THM and the receive highway memory RHM to determine which time slots are in use by station L, and removes the addresses of gates 152 and 153 from the time slot 1 and 2 words respectively in the receive highway memory RHM thus discontinuing the ringing and ring-back tone signals.

When these addresses are removed from the receive highway memory circuit RHM, this circuit discontinues the IHI signal to the inhibit gate IHI. Thereupon, the IH signals in time slots 1 and 2 cause the inhibit gate IG to actuate the interhighway gate IHG in time slots 1 and 2 to interconnect the transmit and receive highways during these time slots, whereby two-way communication is established between station F and station L.

When either the party at station F or station L replaces the handset, the central control CC via the line interrogate circuit LI detects the restoration.

If the party at station F, for example, replaces the handset, the central control CC determines the status of station F and canvasses the time slot words in the transmit highway memory circuit THM to determine the time slot which was used by station F in transmitting to station L (time slot 1 in the present example). Thereupon, the central control CC erases the address of gate 105 from the time slot 1 word in the transmit highway memory circuit THM, and places the address of busy tone gate 151 in the time slot 1 word of the receive highway memory circuit RHM, whereby the busy tone signal reaches station L over gate 151, the receive highway and gate 120 during time slot 1. Also, the central control CC canvasses the time slot words in the receive highway memory circuit RHM to determine the time slot which was used by station F in receiving the information from station L (time slot 2 in the present example). THereupon, the central control CC erases the address of gate 110 from the time slot 2 word in the receive highway memory circuit RHM.

The receive highway memory circuit RHM puts out the IHI signal during the time slot 1 which causes inhibit gate IG to prevent operation of interhighway gate IHG by the IH pulses during time slot 1, thus disconnecting the transmit and receive highways. Thereafter, in order to make time slot 2 available for use by other traffic in the system, the address of station L transmit gate 115 and the address of the interhighway gate IHG will be rewritten in the time slot 1 word of the same memory. Now gate 115 will be pulsed via control lead SLT in time slot 1.

Also, by means of the operation of highway discharge gate HD1 as a result of the IHI signal through OR gate OR1 to the highway discharge gate HD1, and the pulsing of gate 115 in time slot 1, the transmit connection of station L via the transmit highway will be properly terminated during the time slot 1.

When the party at station L replaces the handset, the central control CC, via the line interrogate circuit LI, detects the same, determines the status of station L, and erases the addresses of gates 115 and IHG from the time slot 1 word in the transmit highway memory circuit, and erases the addresses of gates 120 and 151 from the time slot 1 word in the receive highway memory circuit RHM.

Figure 1B:
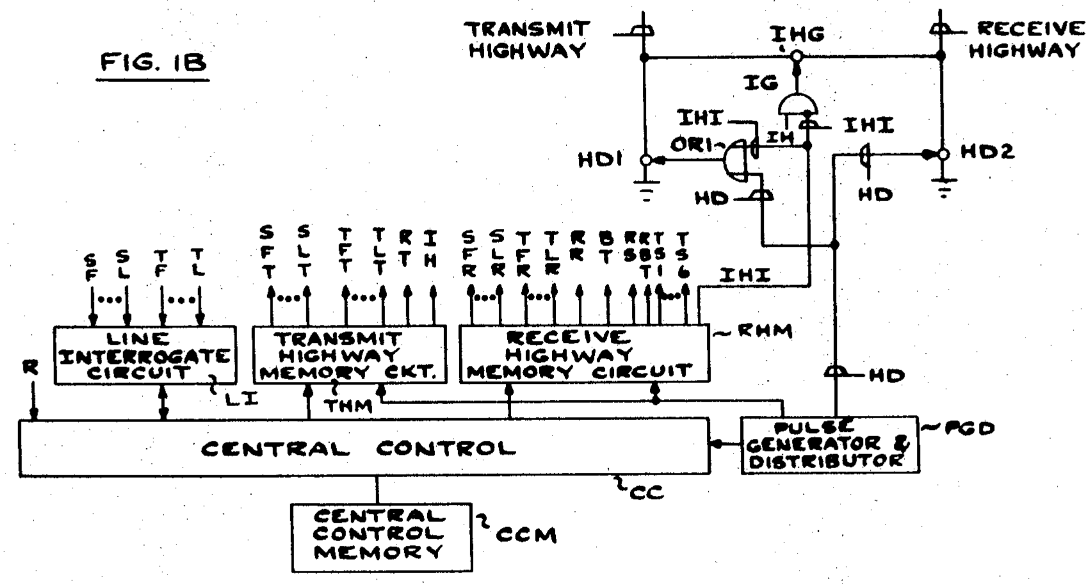

Trunk Call (FIGS. 1A and 1B)

Referring again to FIG. 1A, trunk F illustrates the first trunk of a group of trunks connected to the central office of FIGS. 1A–1B; and trunk L illustrates the last trunk of another group of trunks connected to the central office. We shall assume a call incoming over trunk F and outgoing over trunk L. For illustration, a discontinuous single frequency trunk supervision scheme, as understood by those skilled in the art, is assumed.

An incoming call over trunk F is in evidence by the reception from the trunk of a tone signal in voice frequency receiver (VFR) designated 122A. With receipt of the tone signal, receiver 122A places a distinctive signal on lead TF (which may be a DC signal of a first level constituting logic 1; a DC signal of a different level is logic 0).

The central control CC, via the line interrogates circuit LI, detects the same in its scan of interrogate point TF and connects trunk F to a register, such as 160, by causing gates 125, IHG, and 150 to be pulsed over leads TFT, IH, and RR in time slot 1; and by causing gates 145, IHG, and 130 to be pulsed over leads RT, IH, and TFR in time slot 2.

Seizure acknowledgement tone from register 160 is passed out over trunk F, and tone bursts representative of the called number are received from trunk F by the register 160, which cuts off seizure acknowledgement tone on the first digit received.

The register 160 relays the called number to the central control CC via path R. The central control effects the discontinuance of pulsing of gates 145 and IHG in time slot 2, and the pulsing of gates 150 and IHG in time slot 1; selects an idle trunk, such as trunk L, in the route to the desired destination; effects pulsing of gate 140 and IHG in time slot 1, and pulsing of gates 135 and IHG in time slot 2; and effects the repeated selective pulsing of two of the gates 154–159 in time slot 1 by the receive highway memory circuit RHM to outpulse the called number in a two out of six frequency code over gates 154 (via leads TS1–TS6) and 140.

As a result of the selective pulsing of gates 154–159 by the receive highway memory circuit RHM, each time that leads TS1–TS6 are pulsed in time slot 1, the receive highway memory RHM projects the IHI signal. This signal inhibits gate TG so that the interhighway gate IHG does not receive the IH signal in time slot 1, thereby disconnecting the transmit and receive highway in time slot 1 to prevent the trunk signal TS from reaching the transmit highway. Also, the IHI signal via OR gate OR1, actuates gate HD1 to ground the transmit highway to provide proper terminating impedance for the transmit highway.

After the called number has been outpulsed, the central control CC effects the erasure of the address of trunk signal gates 154–159 in the receive highway memory circuit RHM which terminates the IHI signal in time slot 1 whereby the receive and transmit highways are connected by gate IHG during time slot 1.

Communication in one direction can take place between trunk F and L over gates 125, IGH, and 140 in time slot 1 and in the other direction over gates 135, IHG, and 130.

Further description of this call is not necessary to illustrate the invention.

Figure 4:
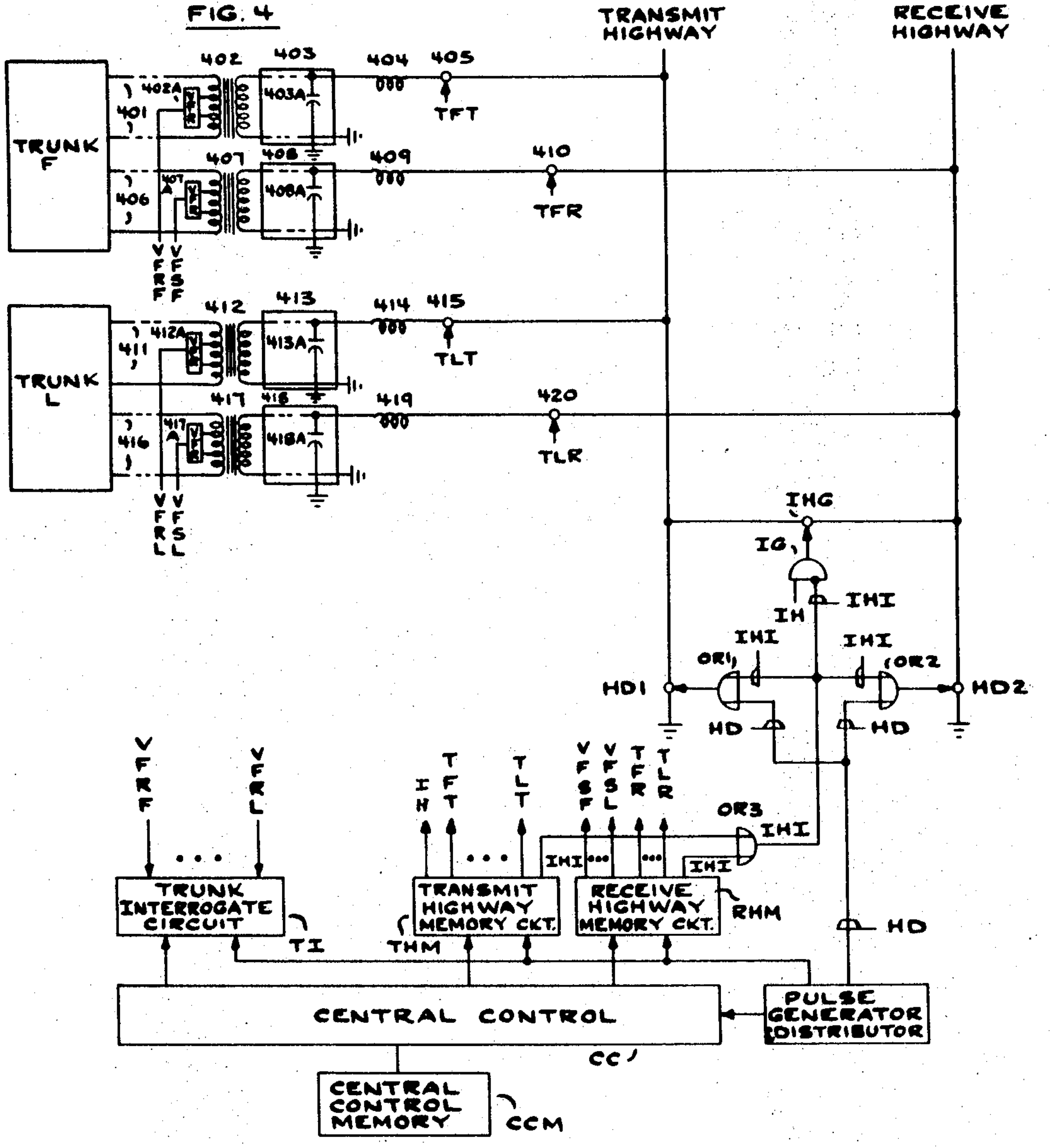
FIG. 4 is a schematic illustration of a modified form of the invention useful, for example, with two-way trunks having voice frequency receivers and voice frequency transmitters.

Trunk Call (FIG. 4)

A system in which each trunk has a voice frequency receiver and a voice frequency sender is illustrated in FIG. 4.

A call incoming over trunk F, which is one of a group of trunks, is evidenced by a tone signal over the trunk to voice frequency receiver VFR designated 402A. As a result thereof, receiver 402A places a distinctive signal on lead VFRF to the trunk interrogate circuit.

The central control CC, via the trunk interrogate circuit TI, detects the same in its scan of interrogate point VFRF, and updates the status of point VFRF in its memory. Thereupon, the central control CC in a manner similar to that described, selects two idle time slots, such as 1 and 2, and an idle register (not shown) and interconnects trunk F and the register, whereby the calling trunk receives seizure acknowledgement tone. Tone bursts indicative of the called number are thereupon received over the trunk by the register and are stored therein. The register transmits these signals to the central control CC.

Thereupon, the central control CC selects an idle trunk, such as L, of a group in the route leading to the called destination; disconnects the register; places the designations of gates 405 and IHG in the time slot 1 word in the transmit highway memory THM and the designation of gate 420 in the time slot 1 word in the receive highway memory RHM, the designations of gates 415 and IHG in the time slot 2 word in the transmit highway memory THM, and the designation of gate 410 in the time slot 2 word in the receive highway memory RHM, for example. Also, the central control CC, via the receive highway memory circuit RHM and lead VFSL, causes the voice frequency sender, designated 417A, to send a timed single frequency tone to indicate trunk seizure to the distant end.

Upon receiving a seizure acknowledgement signal from the distant end, which is detected in tone receiver VFR 412A and observed by the common control via lead VFRL, the common control CC, via the receive highway memory circuit RHM, and lead VFSL, causes the voice frequency sender 417A to send single frequency tone bursts representing the called number in the form of "dial" pulses (trains of tone on-off signals) out over trunk L.

More specifically, the receive highway memory circuit RHM has a word of memory for every time slot. In each word is a bit which the central control CC can selectively condition for the purpose of tone sending. In the present illustration, the time slot 1 tone sending bit would be so conditioned. Each time the scanner in the receive highway memory circuit RHM scans the time slot 1 word, gate 420 is pulsed over lead TLR, a pulse is placed on lead IHI for signal splitting (so that signals will not be propagated back over the incoming trunk), which pulse on lead IHI via OR gates OR1 and OR2 actuates gates HD1 and HD2 for termination purposes. The pulse from the time slot 1 tone sending bit, also together with the decoded gate 420 actuation signal, enables an integrator circuit within the receive highway memory circuit RHM to selectively (as long as the tone sending bit in the memory word remains set in the transmit condition) place and keep a continuous signal on lead VFSL to voice frequency sender 417A to effectuate the above described trunk seizure and "dial" pulsing out over the trunk L. (A similar operation is performed on other trunks, when required, via other control leads).

The distant end signals the called party. When the called party answers, a tone signal incoming to trunk L is received by voice frequency receiver 412A, and the answer signal is detected by the central control CC via the trunk interrogate circuit and scanning point VFRL.

By consulting the contents of the highway memory circuit during normal scanning, the central control CC determines that trunk L utilizes time slot 2 for transmission. Each time slot word in the transmit highway memory THM also has a "-tone received" bit which can be marked to indicate "tone received". Accordingly, the central control CC so marks this bit in the time slot 2 word. Thereafter each time this bit is marked during scanning within the transmit highway memory circuit THM, the transmit highway memory circuit THM issues the IHI signal via an OR gate OR3 to inhibit gate IG which splits the connection by inhibiting operation of interhighway gate IHG and thus prevents the tone from propagating forward over trunk F. Also the IHI signal via gates OR1, OR2, HD1, and HD2 causes proper termination.

It is desirable to split the connection as soon as possible after trunk L begins receiving the signaling tone to prevent transmission of the tone signals over gate 415, the transmit highway, interhighway gate IHG, the receive highway gate 410 and out over trunk F lest someone connected to trunk F receives tone in the receiver of his handset. Such splitting of the connection is further desirable for purposes of recognition through timing and regeneration of signals and preventing an invalid signal from being propagated.

Accordingly, as soon as the central control, via the trunk interrogate circuit, detects the signal on lead VFRL (i.e., within about 10 milliseconds, for example), it determines the status of trunk L in its memory, in conjunction with the transmit highway memory determines what time slot is in use by gate 415 of trunk L, informs the transmit highway memory as to the identity of this time slot, and conditions the transmits highway memory to issue the IHI signal in this time slot by marking the "tone received" bit in time slot word operating gate 415.

Accordingly, in the illustrated case, the transmit highway memory THM gives out the IHI signal in time slot 2 of each frame, inhibiting gate IG and actuating gates HD1 and HD2 via OR gates OR1 and OR2 respectively. This action occurs within 35 milliseconds of the beginning of receipt of tone.

Interhighway gate IHG is thereby prevented from being operated by the IH signal to gate IG splitting the connection from transmit highway to receive highway, and both transmit and receive highways are grounded preserving the resonant transfer characteristics of the transmitting path of trunk L through gate 415 and of the receiving path of trunk F through gate 410.

If the tone signal persists for about 150 ms., the central control CC recognizes it as a valid signal for regeneration purposes, and by setting the "tone transmit" bit in time slot 2 (in this case) at the receive highway memory circuit RHM causes the receive highway memory circuit RHM to give a logic signal to voice frequency sender 407A over lead VFSF as described before in connection with trunk seizure and dial pulse address signalling. As a result sender 407A initiates tone transmission via pair 406 and trunk circuit F out over the trunk F. Tone is transmitted for a time corresponding to the incoming tone duration. In this way the answer signal is relayed back to the originating end. When the incoming tone ceases, the central control CC resets the "tone received" bit in time slot 2 of the transmit highway memory circuit THM, thus removing the IHI signal generated by this circuit.

When the tone sending ceases as a result of the central control CC resetting the "tone transmit" bit in the time slot 2 word of the receive highway memory circuit RHM, the IHI signal generated by this circuit also ceases, and trunks F and L are placed in two-way communication.

Now, assuming a new tone signal is received by trunk F as, for example, an operator recall signal or a release signal (which signals differ in length), if the received signal disappears during an interval 250–350 milliseconds from the start thereof, the central control CC recognizes the signal as an operator recall signal, and after splitting the connection upon recognition of the received signal and effecting the transmission over trunk L of the same length signal as described in connection with the answer signal, causes the receive highway memory circuit RHM to terminate the IHI signal, whereby the IH pulses during time slot 1 via gate TG reach interhighway gate IHG, and gates HD1 and HD2 cease grounding the transmit and receive highways during time slot 1 to reestablish communication between trunks F and L.

If, however, the tone signal received by trunk F is longer than 350 ms., the central control CC recognizes this as a release signal, and after effecting the transmission over the trunk L of the same length signal, causes the transmit and receive highway memories to cease actuating gates 405, IHG, and 420 in time slot 1 and gates 415, IHG, and 410 in time slot 2; and causes the receive highway memory to cease emitting the IHI signal; thereby releasing the internal connection. Release of the external trunk circuit is effected by means of tone signaling on trunks F and L under common control supervision.

Waveforms

Referring to FIGS. 2A–2F therein are shown certain waveforms provided in the system, the waveforms being shown in their relative time relationship.

Figures 2A, 2B, 2C, 2D, 2E, 2F:
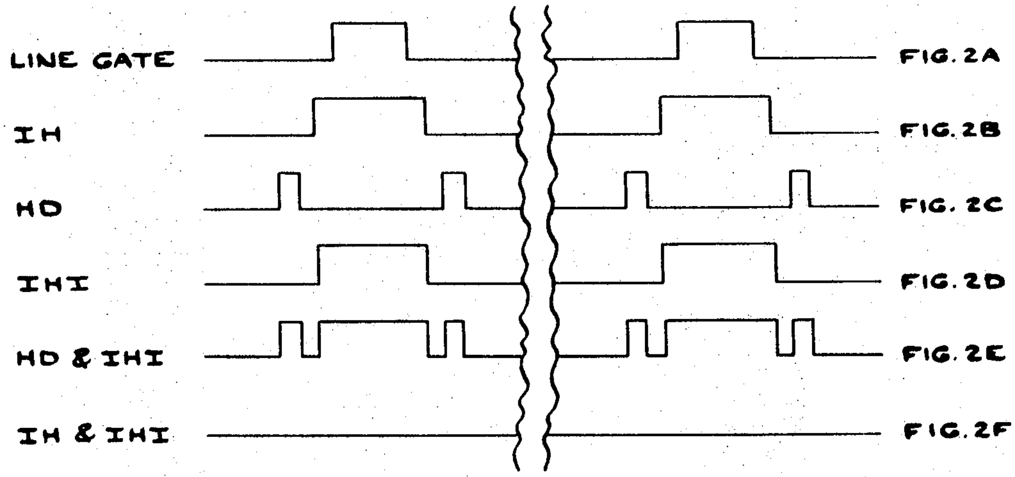
FIGS. 2A–2F are graphical representations of the waveforms of certain signals in the system.

With reference thereto, FIG. 2A shows time division multiplex line gate operating signals, such as for example, as would be provided during time slot 1 over lead SFT to gate 105 for the transmit highway.

FIG. 2B shows signals from the transmit highway memory THM over lead IH which through the inhibit gate IG (when not inhibited) actuate the interhighway gate IHG during time slot 1, for example, and all other time slots in use on the transmit highway. It will be noted that this signal is slightly wider than the line gate signal to reduce losses due to switching transients.

FIG. 2C illustrates the highway discharge signals emitted from the pulse generator and distributor PGD which actuate the highway discharge gates to discharge the highways between every two time slot signal transfer intervals.

FIG. 2D illustrates the IHI signal emitted from the receive highway memory RHM, which signal is of the same length as the IH signal.

FIG. 2E illustrates the signals from the OR gate, such as OR1, to the highway discharge gate, such as HD1, when the inhibit signal is in effect.

FIG. 2F illustrates the signal which is provided to the interhighway gate IHG when the IHI signal is in effect.

Resonant Transfer

Figure 3A:
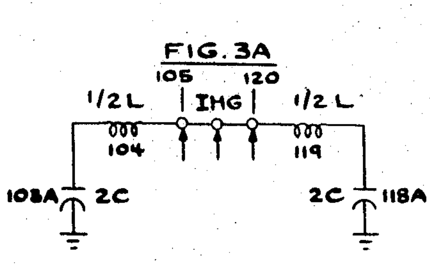
FIGS. 3A, 3B, and 3C illustrate certain resonant transfer circuits in the system.

One embodiment of a resonant transfer circuit which is operative in the illustrated switching circuits is shown in FIG. 3A. By way of example, the illustrated resonant transfer circuit may be the one which is established through gates 105, IHG, and 120 in a call from station F to station L. If the capacitance of capacitors 103A and 118A is each designated as $2c$ and the inductances of inductors 104 and 119 are each designated as $1/2L$, the resonant frequency essentially is determined by the formula $$f=\frac{1}{2\pi\sqrt{2(\frac{1}{2}L)\cdot\frac{1}{2}(2C)}}=\frac{1}{2\pi\sqrt{LC}}$$

Figures 3B, 3C:
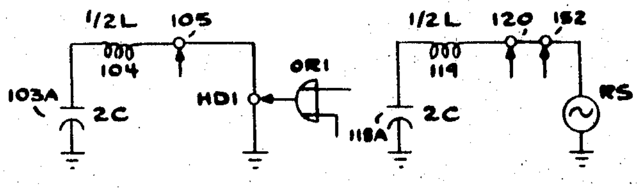

FIG. 3B illustrates a further embodiment of a resonant transfer circuit which is operative in the illustrated switching circuits. Such circuit may be established, for example, over gate 105 when the transmit highway is grounded and the gate IHG is disabled. The resonant frequency is now essentially determined by the formula $$f=\frac{1}{2\pi\sqrt{(\frac{1}{2}L)(2C)}}=\frac{1}{2\pi\sqrt{LC}}$$

FIG, 3C illustrates yet another resonant transfer circuit which is established in the illustrated switching circuits as for example in a circuit established over gates 120 and 152 when station L is being rung during the establishment of a call from station F to station L. The resonant frequency is essentially determined by the formula $$f=\frac{1}{2\pi\sqrt{(\frac{1}{2}L)(2C)}}=\frac{1}{2\pi\sqrt{LC}}$$

It can be seen that the resonant frequency remains the same whether the signals pass over three gates, as in FIG. 3A, over one gate, as in FIG. 3B or over two gates, as in FIG. 3C, and that the techniques of the present invention preserve the resonant frequency for resonant transfer purposes.

It should be appreciated that the input impedance on the line side of the line filters, such as filter 103 in FIG. 1A, for example, remains fixed and of proper value throughout the passband only if proper resonant transfer operation is maintained on the pulsed side of the filter. U.S. Pat. No. 3,100,820 describes a filter developed in accordance with constraints dictated by the respective operation at a particular sampling frequency of a sampling gate, such as for example, 105 or 110, etc., in FIG. 1A. Thus, if the novel arrangement of the present invention is used in TDM systems utilizing the resonant transfer principle, proper terminating impedance is provided even under conditions when the TDM transmission path is split and actual signal transfer to the necessary line equipment, such as filter 108 in FIG. 1A, for example, does not occur.

It will be apparent from the foregoing description that signal splitting as used herein comprises the breaking or splitting of a signaling path to prevent propagation of a signal in an undersired direction. While the specification and drawings specifically set forth an embodiment in which signal splitting is effected between two highways, it should be appreciated that the invention has utility in systems using more than two highways. The technique of the invention also has utility in a single highway system.

While several embodiments of systems in which the invention has practical utility have been illustrated, it will be apparent that other embodiments or systems using different signaling schemes and switching network configurations are within the scope of the invention.

I claim:

1. In a time division multiplex system having a plurality of lines connected to a highway means by time division multiplex gates utilizing resonant transfer circuits for transferring signals over said highway means during the signal transfer interval of selected ones of the time slots in said system, said signal transfer interval being of a shorter length than the time slot, said highway means having at least one transmit highway and one receive highway, and first and second highway discharge gates for selectively grounding said highways, means for providing a first signal to operate said highway discharge gates in a selected time slot outside the signal transfer interval of said selected time slot, at least one interhighway gate means, signal responsive means for selectively controlling said interhighway gate means to connect and split said transmit and said receive highways, means for providing a second signal to said signal responsive means to effect splitting of said transmit and receive highway during the signal transfer interval of said selected time slot, and means responsive to said second signal for operating the highway discharge gate of at least said transmit highway during the same signal transfer interval of said selected time slot in which splitting of said transmit and receive highways is effected by said interhighway gate means.

2. In a time division multiplex system having a plurality of lines connected to a highways means by time division multiplex gates utilizing resonant transfer circuits for transferring signals over said highway means during said signal transfer interval of selected ones of the time slots in said system, said signal transfer interval being of a shorter length than the time slot, said highway means including a transmit highway and a receive highway, a transmit highway discharge gate for use in discharging said transmit highway, a receive highway discharge gate for use in discharging said receive highway, means for selectively enabling both said transmit and said receive discharge gates in a selected time slot outside the signal transfer interval of said selected time slot to discharge the highways associated therewith, at least one interhighway gate connected between said transmit and receive highways, means for controlling said interhighway gate in the connection and splitting of said transmit and receive highways, means for providing an inhibit signal to effect splitting of said highway by said means during the signal transfer interval of said selected time slot in use by one of the highways, means responsive to said inhibit signal to operate the transmit highway discharge gate of said transmit highway during the same signal transfer interval of said selected time slot to provide proper terminating impedance for said transmit highway during the signal transfer interval, and means for selectively connecting a tone signal to the receive highway during the signal transfer interval of said selected time slot.

3. A system as set forth in claim 2 which includes a receive highway memory circuit and a transmit highway memory circuit, and in which said transmit highway memory circuit is connected to provide enabling signals to said means for controlling said interhighway gate in the connection of said transmit receive highways, and said receive highway memory circuit is connected to provide signals to said means for controlling said interhighway gate in the splitting of said transmit and receive highways.

4. In a time division multiplex system having a plurality of lines connected to highway means by time division multiplex gates utilizing resonant transfer circuits for transferring signals during the signal transfer interval of selected ones of the system time slots, said signal transfer interval being of a shorter length than the time slot, said highway means having at least one transmit highway and one receive highway, and a first and second highway discharge gate for selectively discharging said highways, and means for selectively operating said discharge gates during a selected time slot outside the signal transfer interval of said selected time slot, at least one interhighway gate for connecting said transmit and receive highways, inhibit means for selectively inhibiting said interhighway gate, means for providing an inhibit signal to said inhibit means during the same signal transfer interval of said selected time slot, and means also responsive to said inhibit signal to operate the highway discharge gate of at least one of said highways during the same signal transfer interval of said selected time slot.

5. A system as set forth in claim 4 which includes further means responsive to said inhibit signal for operating the highway discharge gate for the other one of said highways during the signal transfer interval of the same time slot.

6. A system as set forth in claim 4 which includes means for selectively connecting a tone signal to the other one of said highways during a time slot signal transfer interval, and in which said means for providing an inhibit signal to enable one of said discharge gates is operative during the same signal transfer interval of the same time slot in use for connection of said tone signal to said other one of said highways.

7. A system as set forth in claim 4 which follows means for selectively connecting trunk signals to both of said highways, and said means for providing an inhibit signal is operative to enable both of said discharge gates during the time slot in use to provide said trunk signals to said highways.

8. A system as set forth in claim 4 in which said means for providing an inhibit signal to said inhibit means includes transmit highways memory means and receive highway memory means.

9. A system as set forth in claim 8 in which said transmit highway memory means includes means for providing an inhibit signal to effect splitting of said highways during receipt of signaling tone over a trunk as the called party answers.

10. A system as set forth in claim 8 in which said highway memory means includes means for providing an inhibit signal to maintain splitting of said highways during relay of an answer signal over a trunk.

11. In a time division multiplex system having a plurality of lines, at least a first and a second highway and time division multiplex gates utilizing resonant transfer circuits for effecting signal transfer over said highways to said lines during the signal transfer interval of highway time slots, interhighway gate means for selectively connecting said first and second highways, at least one discharge gate for selectively discharging at least one of said highways in a selected time slot outside the signal transfer interval of said time slot, signal splitting means for selectively enabling said interhighway gate means to interrupt the connection of said first and second highways during the same signal transfer interval of said selected time slot, and means for energizing said discharge gate during the same signal transfer interval of said time slot to provide proper terminating impedance for said one highway.

* * * * *